3,185,685
MANUFACTURE OF 2-BENZTHIAZYL-SULPHENOMORPHOLIDE

Alfons Anzelm Komander and Neville Tyreman, Manchester, England, assignors to Imperial Chemical Industries Limited, London, England, a corporation of Great Britain
No Drawing. Filed Apr. 10, 1962, Ser. No. 186,353
Claims priority, application Great Britain, May 3, 1961, 16,012
7 Claims. (Cl. 260—247.1)

This invention relates to the manufacture of 2-benzthiazylsulphenomorpholide.

2-benzthiazylsulphenomorpholide is an important rubber accelerator but the methods hitherto available for its preparation are not completely satisfactory in that they do not give a high yield of good-quality product without the use of organic solvents. Attempts to carry out the manufacture under aqueous conditions, for example from N-chloromorpholine and sodium mercaptobenzthiazole, have always afforded 2-benzthiazylsulphenomorpholide contaminated with by-products of which the most important is 2:2-dibenzthiazyldisulphide which renders the 2-benzthiazylsulphenomorpholide unsuitable for use as a delayed-action accelerator.

We have now found that the reaction between sodium mercaptobenzthiazole and N-chloromorpholine in an aqueous medium will give excellent yields of high-quality 2-benzthiazysulphenomorpholide if carried out within a specified range of pH and in the presence of a substantial quantity of a water-soluble salt such as sodium chloride.

According to our invention therefore we provide a process for the manufacture of 2-benzthiazylsulphenomorpholide by interaction of substantially equimolar amounts of a metal salt of mercaptobenzthiazole and N-chloromorpholine in an aqueous medium characterised in that the pH is maintained between 9.0 and 13.0 and that one or more water-soluble salts of an alkali or alkaline earth metal and an inorganic acid or generators of such salts are added in sufficient amount to maintain the total concentration of said salts at not less than 15% of the weight of the aqueous medium.

As examples of metal salts of mercaptobenzthiazole there may be mentioned the sodium, potassium, calcium, and magnesium salts.

As water-soluble salts there are preferred the salts from alkali metals and strong inorganic acids especially the sodium and potassium salts of hydrochloric, hydrobromic, sulphuric and phosphoric acids. As generators of such salts there may be mentioned strong inorganic acids together with salts of the metals with weak acids for example sodium hypochlorite which may be used simultaneously as a source of chlorine for the manufacture of the N-chloromorpholine.

The chloromorpholine may be prepared separately for use in the process, but it is convenient, and preferable in order to avoid the hazard involved in handling the unstable chloromorpholine, to prepare it in situ for example by the action of sodium hypochlorite on morpholine.

The temperature of the interaction may be from 25° C. to 60° C. but temperatures from 45 to 55° C. are preferred.

Good yields of 2-benzthiazylsulphenomorpholide are obtained at pH between 9.0 and 13.0 but the optimum yields require an operating pH between 11.0 and 11.5.

For best yields of 2-benzthiazylsulphenomorpholide it is desirable that there should be at all times free hypochlorite present in amount sufficient to give a redox potential between 110 mv. and 180 mv. and preferably between 140 mv. and 180 mv.

The reagents may be brought together in any conventional manner, but it is convenient to carry out the process of the invention by simultaneous controlled addition of aqueous solutions of mercaptobenzthiazole salts, sodium hypochlorite, and acid to a mixture of morpholine, water-soluble salt and water at a temperature between 45 and 55° C. The pH of the reaction mixture is measured continuously by a pH meter and maintained between 11 and 11.5 by control of the rate of addition of the aqueous acid. The redox potential is also measured continuously and maintained between 140 mv. and 180 mv. by control of the rate of addition of the aqueous hypochlorite solution. Further quantities of water-soluble salt are added at intervals to maintain the concentration over 15%. The 2-benzthiazylsulphenomorpholide is obtained as a water-insoluble solid which may be collected on a filter and washed with water until free from inorganic salts.

The process of our invention has a number of advantages over those hitherto described processes which furnish good yields of 2-benzthiazylsulphenomorpholide. It is carried out in water instead of an organic solvent, thus saving the cost of the solvent and avoiding difficulties inseparable with the use of such solvents for example owing to toxicity and inflammability; it avoids separate manufacture of chloromorpholine and does not involve the use of any substantial excess of morpholine; it obviates the necessity for isolating mercaptobenzthiazole for use in the process since it utilises this in the form in which it is normally first obtained in maunfacture; and it simplifies isolation of the benzthiazylsulphenomorpholide since no removal by distillation of an organic solvent or excess of morpholine is called for.

The invention is illustrated but not limited by the following examples in which all parts and percentages are by weight unless otherwise stated.

Example 1

A mixture of 172 parts of water, 165 parts of morpholine, 5.7 parts of Turkey red oil and 277 parts of sodium chloride is stirred at a temperature between 50 and 54° C. Solutions of 328 parts of sodium mercaptobenzthiazole in 2630 parts of water, of 25% aqueous sulphuric acid and of 263 parts of sodium hypochlorite in 672 parts of water are run simultaneously into the above stirred mixture at such rates that at any time approximately equivalent proportions of each have been added. The pH of the reaction mixture is recorded continuously by pH meter fitted with suitable glass and calomel electrodes, and is maintained between 11.0 and 11.5 by control of the acid flow. The concentration of free hypochlorite should be sufficient to maintain the oxidation potential between 140 mv. and 160 mv., as recorded by a redox meter fitted with calomel and platinum electrodes, and is controlled by variation in the rate of addition of sodium hypochlorite. Further additions each of 277 parts of sodium chloride are made when 960 and 1920 parts of the sodium mercaptobenzthiazole solution have been added. After completion of the additions the reaction mixture is stirred for a further 30 minutes, cooled to 25° C., and the insoluble benzthiazylsulphenomorpholide collected on a filter. After washing with water until free from chloride ions and drying in air at 50° C. a yield of 406 parts (93% calculated on sodium mercaptobenzthiazole) of benzthiazylsulphenomorpholide is obtained.

Example 2

A mixture of 172 parts of water, 165 parts of morpholine, 5.7 parts of Turkey red oil, and 277 parts of sodium chloride is stirred at a temperature between 50° C. and 54° C. Solutions of 323 parts of calcium mercaptobenzthiazole in 2630 parts of water, of 20% aqueous hydrochloric acid and 263 parts of sodium hypochlorite in 672 parts of water, are run simultaneously into the above stirred mixture at such rates that at any time approximately equivalent proportions of each have been added. The pH of the reaction mixture is recorded continuously by pH meter fitted with suitable glass and calomel electrodes, and is maintained between 11.0 and 11.5 by control of the acid flow. The concentration of free hypochlorite should be sufficient to maintain the oxidation potential between 140 mv. and 160 mv., as recorded continuously by redox meter fitted with platinum and calomel electrodes. Further additions of each of 277 parts of sodium chloride are made when 960 and 1920 parts of the calcium mercaptobenzthiazole solution have been added. After completion of the additions the reaction mixture is stirred for a further 30 minutes, cooled to 25° C., and the insoluble benzthiazylsulphenomorpholide collected on a filter. After washing with water until free from chloride ions and drying in air at 50° C., a yield of 406 parts (93% calculated on calcium mercaptobenzthiazole) of benzthiazylsulphenomorpholide is obtained.

*Example 3*

A mixture of 172 parts of water, 165 parts of morpholine, 5.7 parts of Turkey red oil and 277 parts of anhydrous sodium sulphate is stirred at a temperature between 50° C. and 54° C. Solutions of 355 parts of potassium mercaptobenzthiazole in 2630 parts of water, 25% aqueous sulphuric acid and of 263 parts of sodium hypochlorite in 672 parts of water are run simultaneously into the above stirred mixture at such rates that at any time approximately equivalent proportions of each have been added. The pH of the reaction mixture is recorded continuously by pH meter fitted with suitable glass and calomel electrodes, and is maintained between 11.0 and 11.5 by control of the acid flow. The concentration of free hypochlorite should be sufficient to maintain the oxidation potential between 140 mv. and 160 mv., as recorded continuously by redox meter fitted with platinum and calomel electrodes. Further additions each of 277 parts of sodium sulphate are made when 960 and 1920 parts of the potassium mercaptobenzthiazole solution have been added. After completion of the additions the reaction mixture is stirred for a further 30 minutes, cooled 25° C., and the insoluble benzthiazylsulphenomorpholide collected on a filter. After washing with water until free of chloride and sulphate ions and drying in air at 50° C., a yield of 406 parts (93% calculated on potassium mercaptobenzthiazole) of benzthiazylsulphenomorpholide is obtained.

What we claim is:
1. A process for making 2-benzthiazylsulphenomorpholide by reacting in an aqueous medium substantially equimolar amounts of a salt selected from the group consisting of the alkali and alkaline earth metal salts of mercaptobenzthiazole and N-chloromorpholine, said process comprising the steps of providing a mixture of morpholine and water containing at least 15% by weight of a water-soluble salt selected from the group consisting of alkali and alkaline earth metal salts of a strong inorganic acid, simultaneously adding to said mixture an aqueous solution of said mercaptobenzthiazole salt, a hypochlorite and strong, inorganic acid, the rate of addition being such that the pH of the resulting reaction mixture is maintained between 9.0 and 13.0, maintaining sufficient free hypochlorite in the reaction mixture to give a redox potential of 110 to 180 millivolts during said reaction and also maintaining the concentration of said water-soluble salt at not less than 15% by weight of said mixture during said reaction.
2. A process according to claim 1 wherein the mercaptobenzthiazole salt is the sodium salt; the salt of the strong inorganic acid is sodium chloride and the hypochlorite is sodium hypochlorite.
3. A process according to claim 1 wherein the temperature of the resulting mixture is maintained between 25° and 60° C.
4. A process according to claim 1 wherein the temperature of the resulting mixture is maintained between 45° and 55° C.
5. A process according to claim 1 wherein the pH is maintained between 11.0 and 11.5.
6. A process according to claim 1 wherein the redox potential is maintained between 140 and 180 millivolts.
7. A process according to claim 1 wherein said mixture is an aqueous solution of morpholine and sodium chloride and there is added thereto an aqueous solution of sodium mercaptobenzthiazole, sulfuric acid and sodium hypochlorite.

References Cited by the Examiner
UNITED STATES PATENTS

| | | | |
|---|---|---|---|
| 2,271,834 | 2/42 | Carr | 260—247.1 |
| 2,776,297 | 1/57 | Cherlow et al. | 260—247.1 |
| 2,871,239 | 1/59 | D'Amico | 260—247.1 |
| 3,071,585 | 1/63 | Grabiel et al. | 260—247.1 |
| 3,078,258 | 2/63 | Harman | 260—247.1 |

NICHOLAS S. RIZZO, *Primary Examiner.*